Dec. 9, 1924.　　　　　　　　　　　　　　　　　　　1,518,635
W. G COOTE
HANDLE FOR SHEET METAL CONTAINER
Filed Sept. 14, 1922
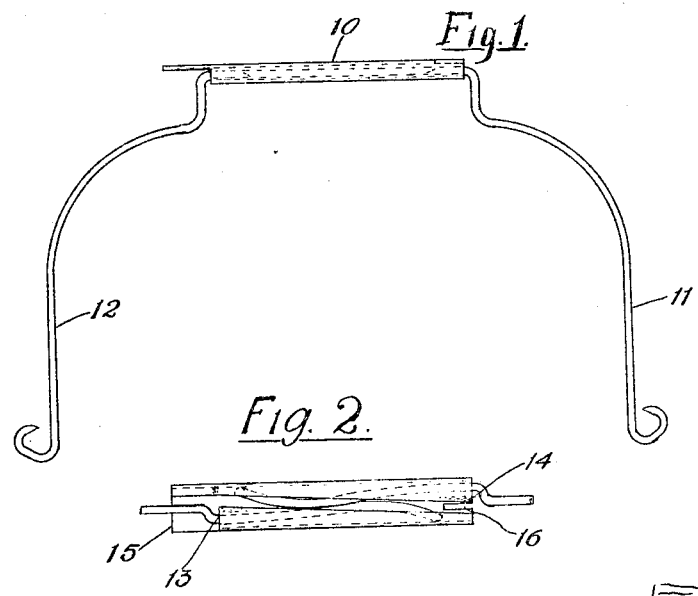
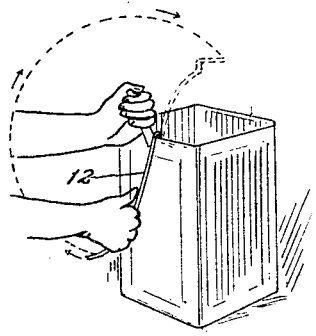
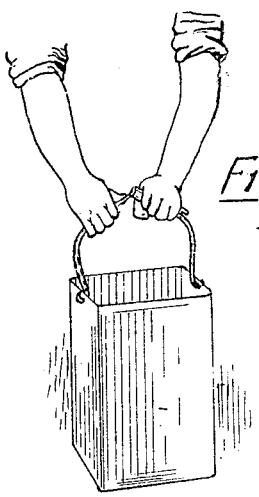
Inventor
William G. Coote
by Heard Smith & Tennant
Attys.

Patented Dec. 9, 1924.

1,518,635

UNITED STATES PATENT OFFICE.

WILLIAM GORDON COOTE, OF NYABING, WESTERN AUSTRALIA, AUSTRALIA.

HANDLE FOR SHEET-METAL CONTAINERS.

Application filed September 14, 1922. Serial No. 588,151.

*To all whom it may concern:*

Be it known that I, WILLIAM GORDON COOTE, of Nyabing, in the State of Western Australia, Commonwealth of Australia, have invented an Improvement in Handles for Sheet-Metal Containers, of which the following description, in connection with the accompanying drawing, is a specification, like characters on the drawing representing like parts.

This invention relates to an improvement in handles for sheet metal containers.

Sheet metal containers, particularly those that have contained hydrocarbon liquids, are frequently, after having served their primary function, fitted with a handle and used as buckets and the like. The simplest procedure hitherto adopted has been to cut out the top with a tin opener, then to punch a hole in each side near the opposite edges, and finally to slip therein the curved up ends of a handle.

An embodiment of the present invention, broadly stated, comprises a device which is functionally identical with the tin opener, the punch, and the handle. The device also possesses the positive advantage that the method of assembling enables the ends of the handle to be considerably curved over, so that accidental disengagement from the holes is impossible.

To enable the invention to be more readily understood, reference will now be made to the accompanying drawings, in which:—

Fig. 1 is an elevation of the assembled handle.

Fig. 2 is an inverted plan view of the gripping portion of the handle, the ends of the arms having been broken away.

Fig. 3 is a perspective view showing a method of cutting a hole in the tin, and

Fig. 4 is a perspective view showing the method of inserting the arms into the gripping portion of the handle.

The complete handle consists of three elements, namely, the gripping member 10 and right and left hand connecting arms 11 and 12.

The gripping member is formed of a metal blank turned over so as to form a channel or passage into which can be slipped the ends of the arms. At opposite ends an edge is turned inwardly at 13 and 14 so as to more firmly hold the arms and to check any tendency they may have to slip out. One end of the gripping member can be fashioned as a cutting edge 15 whilst a narrow slot 16 is cut at the other end. Each of the handle arms are substantially identical, comprising a pointed holding hook 9 at one end, a curved central portion 7 and a substantially horizontal part 6 at the other end. The latter portion is bent somewhat in the form of an arc of relatively great radius.

In fitting the device to a metal container, the top of the latter is cut out by holding the gripping member 10 in one hand, inclined so that the point of the cutting edge 15 is in position against the edge to be cut. The back of the member 10 is then hit with a convenient object, which causes a cut in the sheet metal top. Whilst progressively moving the cutter backward, the blows are continued until the circuit is completed, when the top will of course be cut out. A handle arm (as 12 in Fig. 3) is then moved down so that the cutting point 8 thereof is centrally placed on the inside of a container side. The gripping portion of the handle is then taken and held with the slot 16 embracing the edge of the receptacle close to the arm so as to steady it for the subsequent operation. On pulling the arm downwardly, and then swinging it upwardly, as indicated by the dotted lines and arrows in Fig. 3, the point 8 of the hook 9 will perforate the side of the receptacle and the hook 9 will enter the perforations thus made. The other arm is then similarly attached to the opposite side of the receptacle and when both arms have been thus connected they are brought together, the horizontal portion 6 of one arm is inserted into one end of the gripping member 10 and the horizontal portion 6 of the other arm is then inserted into the opposite end of said gripping member as illustrated in Fig. 4. It will be noted that the horizontal part 6 of the arms are curved slightly, this being best seen in Fig. 2, and when they are in place the curved portions pass one another and engage in behind each other thus firmly holding the retaining member in place. The sheet metal receptacle as fitted with a handle is now capable of being used as a bucket and the like. When, as will usually be the case, the life of the handle exceeds that of the receptacle, the former can be readily removed and fitted to another receptacle.

The device described as above may be modified by persons skilled in the art without departing from the scope of the invention as defined in the appended claims.

I claim:—

1. Improvements in handles for sheet metal containers comprising the combination of separable right and left hand connecting arms, each having a hook curved over so that accidental displacement from the holes in the container is checked, and means for detachably connecting the arms.

2. Improvements in handles for sheet metal containers comprising the combination of separate right and left hand connecting arms and a gripping member in which the upper ends of such arms detachably are held.

3. Improvements in handles for sheet metal containers comprising the combination of a gripping member; a cutting edge formed on such member; a connecting arm slipping into such gripping member from one end, and another connecting arm slipping into the said gripping member from the other end.

4. Improvements in handles for sheet metal containers comprising a gripping member; a cutting edge at one end of such member; a slot at the other end of the said member; a connecting arm with a curved end that slips into the gripping member from one end, and another connecting arm also with a curved end, that slips into the gripping member from the other end, whereby such arms spring into their correct position in the said gripping member.

5. Improvements in handles for sheet metal containers comprising the combination of separate right and left hand connecting arms, each having a hook at one end terminating in a point whereby the hook can be connected to a receptacle by puncturing the wall of the receptacle with the point of the hook and entering the hook into the aperture thus made, and means for detachably connecting the other ends of said arms.

6. Improvements in handles for sheet metal containers comprising the combination of separate right and left hand connecting arms, each having a hook at one end terminating in a point whereby the hook can be connected to a receptacle by puncturing the wall of the receptacle with the point of the hook and entering the hook into the aperture thus made, the other ends of said arms having an overlapping relation and a gripping member in which the overlapping portions of the arms are detachably retained.

Dated this 19th day of July, 1922.

WILLIAM GORDON COOTE.

Witnesses:
M. BOUNERUP,
E. TROTTER.